(12) United States Patent
Naik et al.

(10) Patent No.: US 10,831,439 B1
(45) Date of Patent: Nov. 10, 2020

(54) REDUCING AUDIO SYNDROME CONTENT

(71) Applicant: International Business Machines Corporation, Armonk, NY (US)

(72) Inventors: Sandeep Naik, Pune (IN); Sasikanth Eda, Vijayawada (IN); Deepak Ghuge, Sangamner (IN); Manojkiran Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/512,598

(22) Filed: Jul. 16, 2019

(51) Int. Cl.
| G06F 3/16 | (2006.01) |
| G10K 11/175 | (2006.01) |
| H04W 72/04 | (2009.01) |
| G11B 27/031 | (2006.01) |
| G10L 25/51 | (2013.01) |
| H04W 84/12 | (2009.01) |

(52) U.S. Cl.
CPC ............ *G06F 3/165* (2013.01); *G10K 11/175* (2013.01); *G10L 25/51* (2013.01); *G11B 27/031* (2013.01); *H04W 72/0453* (2013.01); *H04W 84/12* (2013.01)

(58) Field of Classification Search
None
See application file for complete search history.

(56) References Cited

U.S. PATENT DOCUMENTS

| 5,812,937 A * | 9/1998 | Takahisa ................ H04H 20/28 455/45 |
| 2009/0233563 A1* | 9/2009 | Eubanks ............... H03J 1/0058 455/186.1 |
| 2017/0112431 A1 | 4/2017 | Levine et al. |
| 2018/0278984 A1 | 9/2018 | Aimone et al. |
| 2019/0142350 A1* | 5/2019 | Bastide ................. G06F 16/437 600/300 |

OTHER PUBLICATIONS

Meg, "Why do songs get stuck in your head?", Oct. 16, 2009, 5 pages http://www.straightdope.com/columns/read/2901/why-do-songs-get-stuck-in-your-head/.
Wikipedia, "Earworm", From Wikipedia, the free encyclopedia, last edited on Apr. 20, 2019, printed Apr. 23, 2019, 5 pages, https://en.wikipedia.org/wiki/Earworm.

(Continued)

*Primary Examiner* — James K Mooney
(74) *Attorney, Agent, or Firm* — Donald J. O'Brien

(57) ABSTRACT

Embodiments are disclosed for reducing audio syndrome content. The techniques include generating a listener profile. The listener profile includes data associated with content that induces an audio syndrome for a listener. The techniques include determining that current content includes content that induces the audio syndrome for the listener. A trained audio syndrome predictor makes the determination based on the listener profile. The techniques include, in response to determining that the current content includes the content that induces the audio syndrome for the listener, generating an alternative audio content that suppresses audibility of the content that induces the audio syndrome for the listener. Additionally, the techniques include presenting the alternative audio content for the listener in place of the current content.

20 Claims, 9 Drawing Sheets

(56) References Cited

OTHER PUBLICATIONS

Wikipedia, "Sound masking", From Wikipedia, the free encyclopedia, last edited on Apr. 7, 2019, printed Apr. 23, 2019, 3 pages, https://en.wikipedia.org/wiki/Sound_masking.

Beal, V., "Cognitive Radio (CR)", webopedia, printed Apr. 23, 2019, 3 pages https://www.webopedia.com/TERM/C/cognitive_radio.html.

Elmore, B., "Let Me Guess Your Phobia", playbuzz.quiz, Oct. 21, 2018, 2 pages https://www.playbuzz.com/brieannaw10/let-me-guess-your-phobia.

Schaefer, R., "Mental Representations in Musical Processing and their Role in Action-Perception Loops", Empirical Musicology Review, vol. 9, No. 3-4, 2014, 16 pages.

Auren et al., "Music Recommendations Based on Real-Time Data", Bachelor of Science Thesis in Computer Science and Engineering, May 2018, 56 pages.

Mell et al., "The NIST Definition of Cloud Computing", Recommendations of the National Institute of Standards and Technology, Sep. 2011, 7 pages.

\* cited by examiner

REDUCING AUDIO SYNDROME CONTENT

BACKGROUND

The present disclosure relates to audio syndrome content, and more specifically, to reducing audio syndrome content.

In a world where technology expands into more facets of everyday living, there can be an associated response wherein, as a result of changes in the physical environment, people can become more vulnerable to physical and mental illnesses. With regard to mental illnesses, some research suggests that phobias are one of the most common mental disorders in the United States (U.S.). According to the National Institute of Mental Health (NIMH), people in the U.S. have specific phobias, can experience social phobias, and/or have agoraphobia.

SUMMARY

Embodiments are disclosed for reducing audio syndrome content. The techniques include generating a listener profile. The listener profile includes data associated with content that induces an audio syndrome for a listener. The techniques include determining that current content includes content that induces the audio syndrome for the listener. A trained audio syndrome predictor makes the determination based on the listener profile. The techniques include, in response to determining that the current content includes the content that induces the audio syndrome for the listener, generating an alternative audio content that suppresses audibility of the content that induces the audio syndrome for the listener. Additionally, the techniques include presenting the alternative audio content for the listener in place of the current content.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
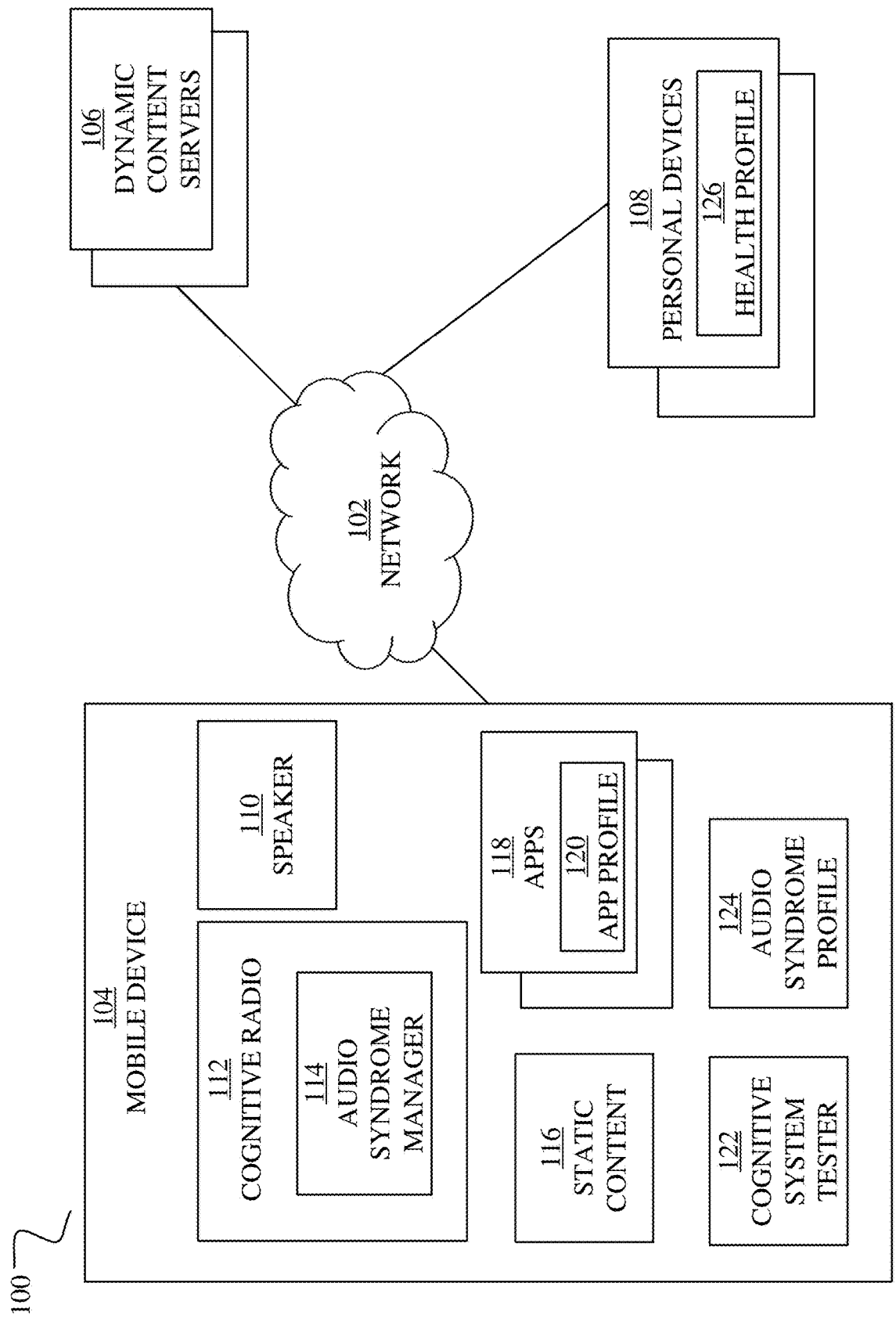
FIG. 1 is a block diagram of a system for reducing audio syndrome content, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Phobias, however are merely one illness, or syndrome that can affect one's mental well-being. A comparatively less serious syndrome than mental illness is an audio syndrome commonly referred to as earworm. Earworm, sometimes referred to as brain worm, sticky music, stuck song syndrome, and involuntary musical imagery (INMI), is a phenomenon wherein a specific piece of music continually repeats through a person's mind after it is no longer playing. In other words, an earworm is the experience when one's mental thoughts can become preoccupied with an audio phenomenon, such as a catchy jingle from a commercial. In fact, earworm is one of the most common audio syndromes that people can experience.

Consider a scenario where, a person who travels in a cab every day to and from an office, listens to the music selected on FM radio by the cab driver, which may not be in this person's native language. Further, many marketing strategies for radio jockeys and advertisements attempt to persuade listeners with music and words that are catchy or sticky, as opposed to plain music and words. In this scenario, the person can be suffering from high blood pressure or stress because of work or family issues. Further, when this person tries to sleep at night, he or she may have an unpleasant earworm experience, wherein the lyrics and music from the cab journey keep repeating as running thoughts in this person's head. Sometimes, earworms can seem uncontrollable which could result in irritation, sleep disorders, and possibly medication to resolve these issues.

Accordingly, embodiments of the present disclosure include a cognitive radio configured to analyze and estimate a listener's sensitivity to audio syndromes. Further, such embodiments can analyze audio content, such as a radio station playlist and pattern, to suppress or neutralize lyrics, music, words, and advertisements in real time so that the person can avoid the discomfort caused by audio syndromes, such as earworm.

Referring now to FIG. 1, which is a block diagram of a system 100 for reducing audio syndrome content, in accordance with some embodiments of the present disclosure. The system 100 includes a network 102, mobile device 104, dynamic content servers 106, and personal devices 108. The network 102 can be one or more computer communication networks, including local area networks and wide-area networks, such as the Internet. The mobile device 104, dynamic content servers 106, and personal devices 108 can be in communication over the network 102.

The mobile device 104 can be a mobile computing device having a computer processor (not shown) and a speaker 110. The mobile device 104 can be a smartphone, tablet, laptop, and/or wearable computing device. The dynamic content servers 106 can be computer servers that provide streaming audio content to devices, such as the mobile device 104.

According to embodiments of the present disclosure, the mobile device 104 can be associated with a listener, who may also possess multiple personal devices 108. The personal devices 108 can include, for example, smartphones, smartwatches, smart speakers, fitness watches, fitness trackers, wearable computing devices, smart Internet of Things (IoT) devices, and the like.

Because the personal devices 108 can be worn by the listener, the personal devices can include software and hardware to track health information about the listener, such as heart rate, blood pressure, and the like. Accordingly, the personal devices 108 can include health profiles 126 that document such information. Further, by analyzing changes in the listener's heart rate during the day, the personal devices 108 can also provide information about the listener's sleeping patterns. Accordingly, the health profiles 126 can include sleeping pattern information about the listener. Such information can be useful for identifying mental health stressors, such as insomnia and oversleeping. Knowing whether and when the listener experiences such stressors can be useful for determining whether the listener is more or less predisposed to audio syndromes, and potentially what type of audio content can trigger an audio syndrome for the listener.

The mobile device includes a cognitive radio 112, static content 116, applications (apps) 118, cognitive system tester 122, and audio syndrome profile 124. The cognitive radio 112 can be an adaptive, software defined intelligent radio and network technology that can detect available channels in a wireless spectrum. The wireless spectrums can include, e.g., frequencies used by the Institute of Electrical and Electronics Engineers (IEEE) 802.11 specification protocols, as well as, FM, AM, and shortwave radio frequencies, or any other frequency capable of wireless transmission. Further, the cognitive radio 112 can analyze what the cognitive radio 112 itself is broadcasting. Additionally, the cognitive radio 112 can connect and exchange information with various personal devices 108, such as smart IoT devices. Additionally, the cognitive radio 112 can seamlessly change transmission parameters to enable switching between multiple communication channels to run and improve the efficiency of radio operation. Cognitive radio 112 can use several technologies including adaptive radio, where the communications system monitors and modifies its own performance, and software defined radio (SDR) where traditional hardware components including mixers, modulators and amplifies have been replaced with intelligent software. The cognitive radio 112 can request streaming audio content from the dynamic content servers 106.

Alternatively, the cognitive radio 112 can play audio content from the static content 116. The static content 116 can be audio content stored locally on the mobile device 104, such as a podcast, a static Internet source, and/or in an electronically connected peripheral device, such as an optical disc player for music and/or movies, for example.

The apps 118 can include any number of computer software applications installed on the mobile device, and can provide numerous varying functions, such as instant messaging, video conferencing, transportation logistics, e-mail, and so on. The apps 118 can also include app profiles 120 that can include parameters describing how to configure the associated app 118 for the listener. The profiles 120 can include personal information, such as height, weight, demographic information, and other information that can be useful for predicting characteristics of potentially audio syndrome-inducing content for the listener.

The cognitive system tester 122 can be a machine-learning model that is trained to predict specific characteristics of audio content that can potentially induce an audio-syndrome in the listener. The cognitive system tester 122 can store these predicted characteristics in the audio syndrome profile 124, and can include specific words, lyrics, advertisements, tonal patterns or characteristics, volumes, etc. According to embodiments of the present disclosure, the cognitive system tester 122 can generate the audio syndrome profile 124 based on the health profiles 126 and app profiles 120. Additionally, the cognitive system tester 122 can query the listener for audio-syndrome and health-related information.

As stated previously, audio content can include content, such as catchy jingles, that can cause audio syndromes, such as earworm. Accordingly, the cognitive radio 112 can include an audio syndrome manager 114 that can analyze streaming audio content and identify content that can potentially trigger an audio syndrome response in a listener. Further, the audio syndrome manager 114 can replace the identified audio content with alternative audio content that does not contain the identified audio content. The audio syndrome manager 114 can be a machine learning model that is trained to predict an audio syndrome response to characteristics of audio content based on an audio syndrome profile 124 of the listener. For example, the alternative audio content can include silence, audio content from another radio channel, or a combination of the identified audio content with sound masking.

Sound masking is the addition of sound created by digital generators, and distributed by speakers through an area, to reduce distractions or provide confidentiality when needed. The sound can be broad band random, which conveys no information about itself to a listener. In contrast to white noise and pink noise, where the sound spectrum and level is configured into a predetermined shape that provides a particular degree of privacy, sound masking operates by covering up or masking unwanted sounds, like a perfume that covers up other odors.

Figure 2:
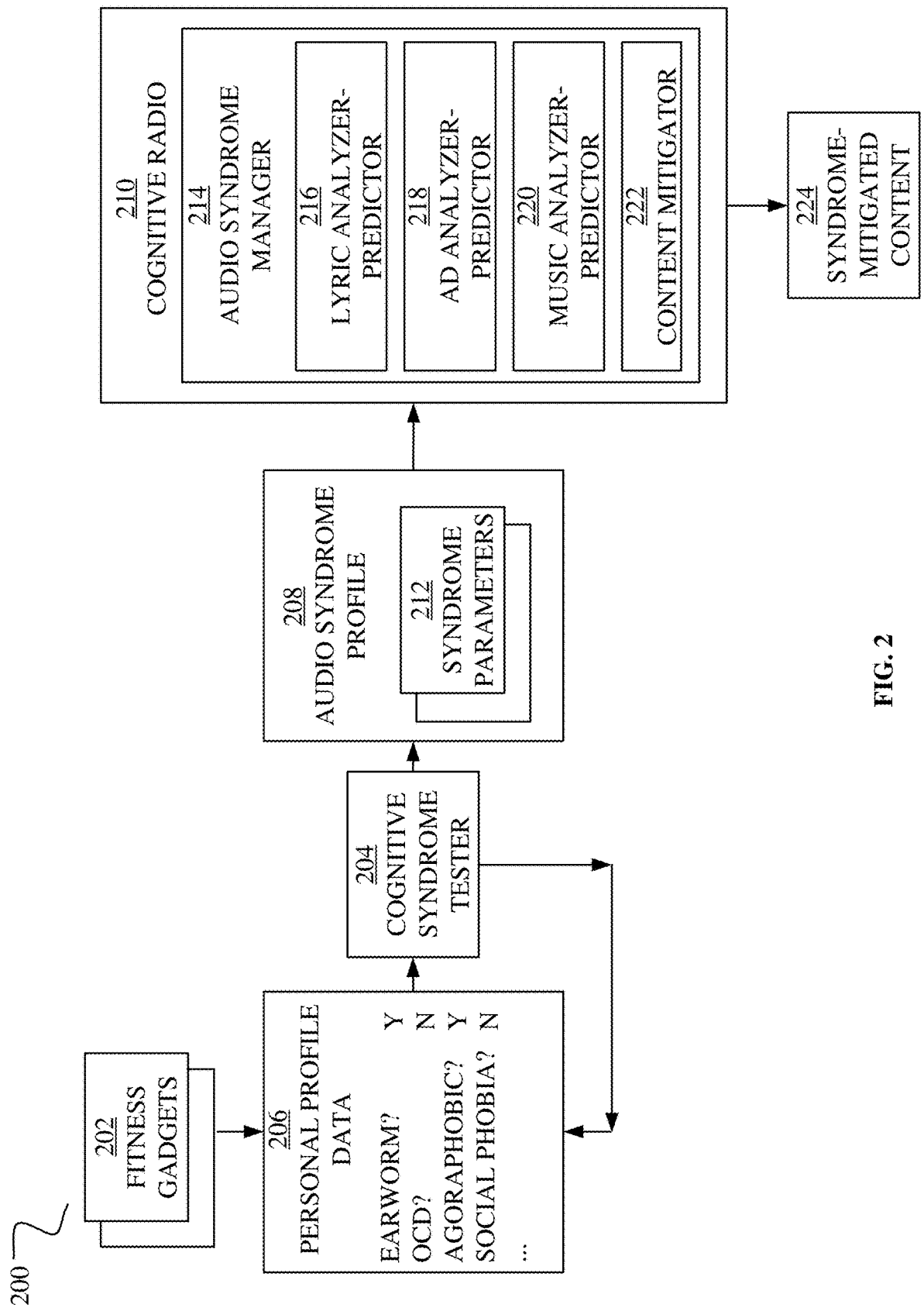
FIG. 2 is a block diagram of a system for reducing audio syndrome content, in accordance with some embodiments of the present disclosure.

Referring now to FIG. 2, which is a block diagram of a system 200 for reducing audio syndrome content, in accordance with some embodiments of the present disclosure. The system 200 can include fitness gadgets 202, a cognitive syndrome tester 204, personal profile data 206, an audio syndrome profile 208, and a cognitive radio 210.

According to embodiments of the present disclosure, the system 200 can help analyze and estimate the listener's sensitivity towards earworm syndrome (and the words or music that he/she is sensitive to), as well as analyze audio content, such as, a radio channel playlist. Further, the system can identify patterns in the audio content, and use these learnings to suppress or neutralize, in real-time, lyrics, music, words, and/or advertisements that can potentially induce an audio syndrome in the listener. More specifically, the cognitive syndrome tester 204 can construct an audio syndrome profile 208 that is specific to the listener based on personal profile data 206 that can be collected from fitness gadgets 202 and by the cognitive syndrome tester 204 itself. The fitness gadgets 202 can include personal, mobile, and/or wearable computing devices, such as smartwatches, fitness trackers, and the like. The audio syndrome profile 208 can include syndrome parameters 212 that specify words, music, patterns, and the like that the cognitive syndrome tester 204 predicts can potentially induce an audio syndrome in the listener. Further, the cognitive radio 210 includes an audio syndrome manager 214 that uses machine-learning trained predictors and the audio syndrome profile 208 to identify potentially audio syndrome-inducing audio content provided by the cognitive radio 210. Further, the audio syndrome manager 214 can generate syndrome-mitigated content 224, and provide syndrome-mitigated content 224, wherein potentially earworm-inducing lyrics/music/words/advertisements are removed, in real-time, from the audio content provided by the cognitive radio 210.

The personal profile data 206 of the listener is generated by using data from fitness gadgets 202, and/or data collected by the cognitive system tester 204. The listener can authorize the fitness gadgets 202 to analyze his/her sleeping pattern and predict whether she is sensitive to certain sleep or earworm syndrome(s). Along with sleep data, heart rate, exercise patterns, stress levels are also considered to identify any potential disorders that can influence potential audio syndromes.

The cognitive syndrome tester 204 can be a data collector and a machine-learning model. More specifically, the cognitive syndrome tester 204 can be trained to generate syndrome parameters 212 based on the personal profile data 206. For example, the cognitive syndrome tester 204 can be trained with several phobias and their symptoms. According to embodiments of the present disclosure, the cognitive syndrome tester 204 can ask a few simple questions of the listener and, based on the answers given, determine the probability of the listener having certain syndromes/phobias. Additionally, the cognitive syndrome tester 204 can build the personal profile data 206 by seeking listener input related to earworm terms, words, or music. Accordingly, the listener can provide, and periodically update, any known earworm or sticky content for analysis in the personal profile data 206. This known earworm data can be provided as text or lyric entry, or as a recording of the sticky word or music, for example. Accordingly, the cognitive syndrome tester 204 can generate an audio syndrome profile 208 that identifies patterns, words, and music that can cause audio syndromes, such as earworm, for the listener.

Further, the audio syndrome manager 214 can generate the syndrome-mitigated content 224 based on the audio syndrome profile 208. The audio syndrome manager 214 can include AI-based analyzers and predictors, such as lyric analyzer-predictor 216, advertisement (ad) analyzer-predictor 218, music analyzer-predictor 220, and a content mitigator 222.

Many AI based algorithms can analyze and classify lyrics, using more sophisticated dimensions of a song, such as, text, vocabulary, style, semantics, orientation towards the world, song structure, and the like. In this way, such algorithms can predict genre, mood, style, and tempo, and determine whether the song revolves around love/loneliness/romance/politics. Further, such algorithms can distinguish and classify different parts of the songs as happy, sad, celebratory, commiserating, and so on.

In contrast, embodiments of the present disclosure can analyze the pattern of a radio channel and predict the sticky words, music, lyrics, ads that can potentially induce an audio syndrome for the listener. With some radio channels, the pattern of usage could be static, and with certain others, the pattern could be dynamic (often controlled by news or current happenings in the locality).

Accordingly, the lyric analyzer-predictor 216 can be a machine-learning model that is trained to predict whether specific lyrics of audio content can potentially induce audio syndrome for the listener. The lyrics can be words that sound as if spoken or sung in a human or mechanical voice. If the lyric analyzer-predictor 216 determines that the audio content provided by the cognitive radio 210 contains audio syndrome content, the lyric analyzer-predictor 216 can determine a specific period of time during which the lyrics occur. Accordingly, the content mitigator 222 can generate syndrome-mitigated content 224, wherein the identified audio syndrome lyrical content is suppressed, neutralized, and/or removed. In some cases, the content mitigator 222 can leverage traditional hardware components such as a lyric analyzer, tone neutralizer, and/or sound masker to dynamically suppress potentially audio syndrome-inducing content.

Further, the ad analyzer-predictor 218 can be a machine-learning model that is trained to predict whether a specific advertisement in the audio content can potentially induce audio syndrome for the listener. The ad analyzer-predictor 218 can identify such advertisements with reference to a specific commercial, product, category of products, product brand, and so on. If the ad analyzer-predictor 218 determines that the audio content provided by the cognitive radio 210 contains audio syndrome content, the ad analyzer-predictor 218 can determine a specific period of time during which the ad occurs. Accordingly, the content mitigator 222 can generate syndrome-mitigated content 224, wherein the identified audio syndrome ad content is suppressed, neutralized, and/or removed.

Further, the music analyzer-predictor 220 can be a machine-learning model that is trained to predict whether specific music in the audio content can potentially induce audio syndrome for the listener. The music analyzer-predictor 220 can identify such music with reference to a specific song, portion of song, singer, vocal type, musical instrument, genre of music, and so on. If the music analyzer-predictor 220 determines that the audio content provided by the cognitive radio 210 contains audio syndrome content, the music analyzer-predictor 220 can determine a specific period of time during which the music occurs. Accordingly, the content mitigator 222 can generate syndrome-mitigated content 224, wherein the identified audio syndrome music content is suppressed, neutralized, and/or removed.

Accordingly, the audio syndrome manager 214 can observe and analyze the pattern of a radio channel that the cognitive radio 210 is providing, to determine whether there is any audio syndrome content. The cognitive syndrome tester 204 can receive inputs from the listener's fitness gadgets 202 and other mechanisms having information related to potentially sticky content/music/lyrics/ads, etc. for the listener. Further, the audio syndrome manager 214 can analyze the content of radio station broadcasts and channel changes to determine if the pattern of the audio content being provided by the cognitive radio 210 includes a pattern that is potentially audio syndrome inducing. While getting inputs via the cognitive syndrome tester 204 can be useful for identifying potentially audio syndrome-inducing content, the techniques described herein can be performed without such inputs. For example, app profiles, such as the app profiles 120 described with respect to FIG. 1, can include relevant information, such as song lists in the profile 120 of a music streaming app.

Further, the audio syndrome manager 214 can analyze local happenings in a specific geographic region. For example, the audio syndrome manager 214 can collect information about local events from social media. In this way, the audio syndrome manager 214 can learn to determine whether an unexpected change in the pattern of a local radio broadcast on the cognitive radio 210 is potentially audio syndrome inducing, or whether the pattern change is related to a local event.

For example, the audio syndrome manager 214 can determine that the audio content has a static characteristic or pattern. A static pattern can indicate a relatively small deviation in the characteristics of the audio content. For example, if a radio station merely plays one genre of music, the audio syndrome manager 214 can determine that the audio content has a static pattern. For static audio content, the content mitigator 222 can suppress or neutralize sticky contents by removing the music or pattern. Alternatively, the content mitigator 222 can generate the syndrome-mitigated content 224 by reading out the plain text of potentially audio syndrome-inducing content. Alternatively, the content mitigator 222 can generate the syndrome-mitigated content 224 by changing the source of audio content on the cognitive radio 210. For example, the content mitigator 222 can cause the cognitive radio 210 to switch to another radio station and/or channel for the duration of the identified content, and then switch back to original source.

If the audio syndrome manager 214 determines that the pattern of the audio content is dynamic, the content mitigator 222 can impose a time delay before presenting the audio content over a speaker, such as the speaker 110 described with respect to FIG. 1. Referring back to FIG. 2, during the time delay, the cognitive radio 210 can continue to obtain a radio station signal in real time. The amount of time to delay the audio content can depend on resources for the cognitive radio 210, such as a buffer size and the compute capability to suppress or neutralize the sticky behavior. Once the audio content is delayed, the content mitigator 222 can suppress or neutralize the potentially audio syndrome-inducing content as described above.

Figure 3:
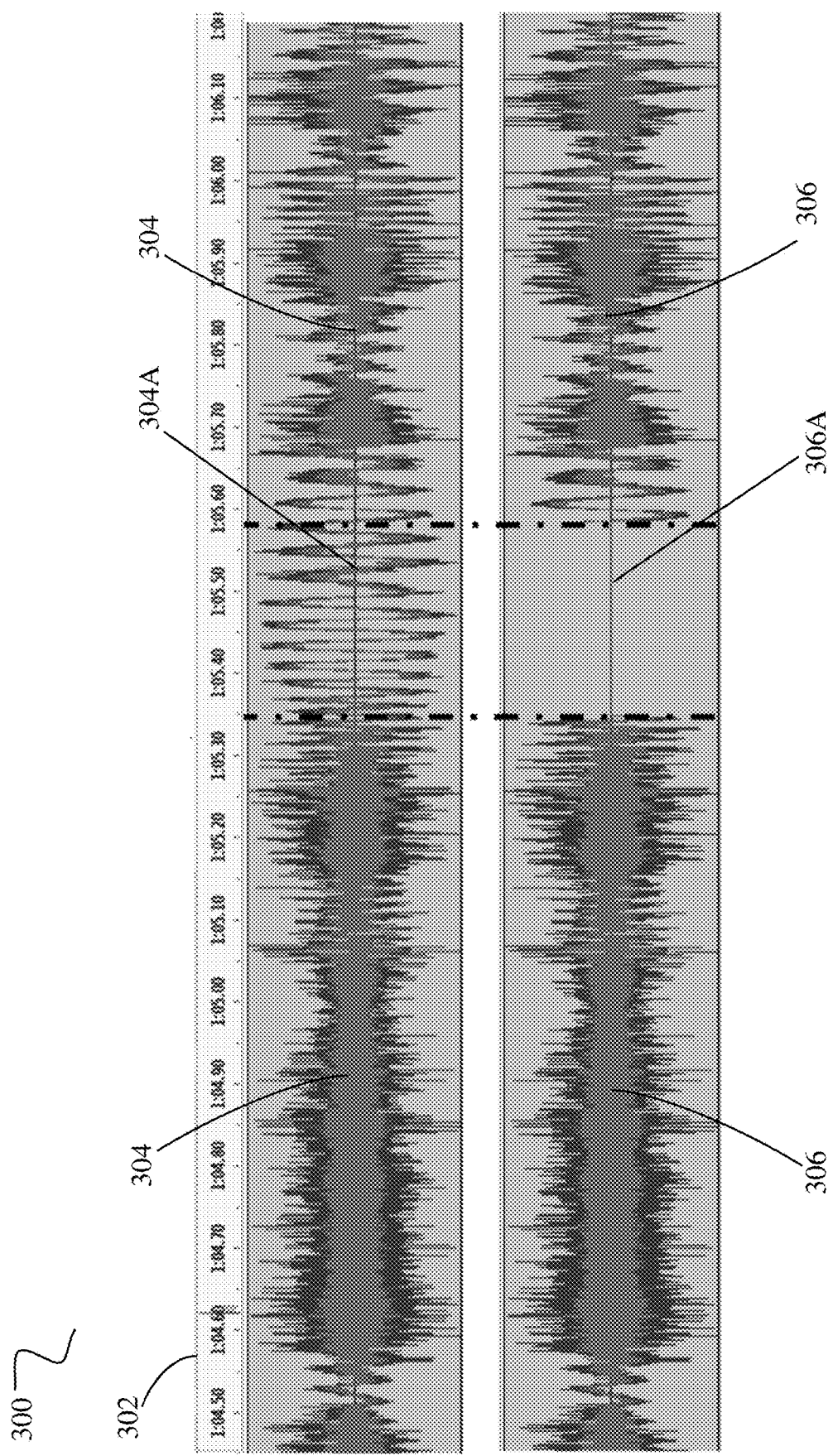
FIG. 3 is a chart of example sound patterns for reducing audio syndrome content, in accordance with some embodiments of the present disclosure.

FIG. 3 is a chart 300 of example audio content played during a timeline 302, in accordance with some embodiments of the present disclosure. The chart 300 includes sound patterns 304, 304A, 306, and 306A. The sound pattern 304 represents a sound pattern that the cognitive radio 112 receives from a source, such as a radio station, a dynamic content server 106, or static content 116. The sound pattern 306 represents a sound pattern that the mobile device 104 plays over the speaker 110.

The sound pattern 304A can represent sound waves for audio content that the audio syndrome manager 114 determines contains potentially audio syndrome-inducing content for the listener. Accordingly, the sound pattern 306A represents the sound pattern of the syndrome-mitigated content that the mobile device 104 plays over the speaker 110. In this example, the sound pattern 306A can represent relative silence in comparison to sound patterns 304A and 306.

Figure 4:
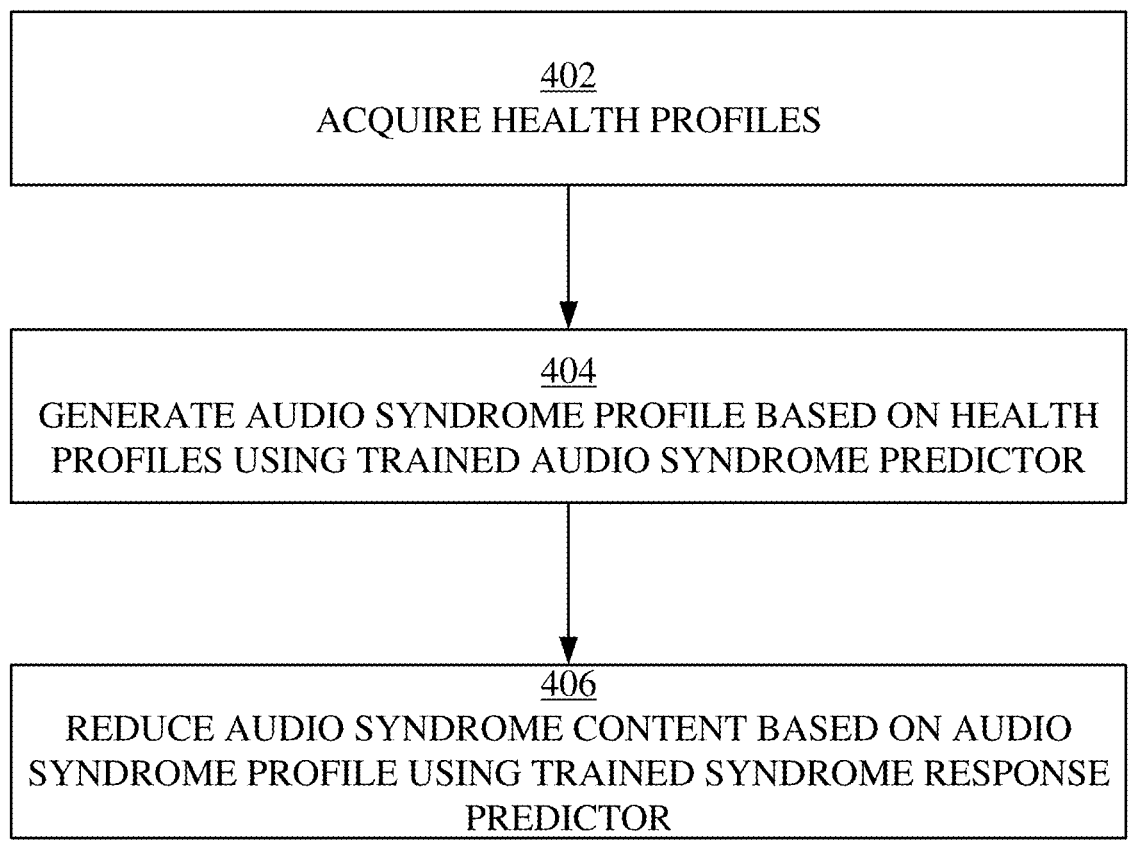
FIG. 4 is a flowchart of an example method for reducing audio syndrome content, in accordance with some embodiments of the present disclosure.

FIG. 4 is a flowchart of an example method 400 for reducing audio syndrome content, in accordance with some embodiments of the present disclosure. The audio syndrome manager 114 and cognitive system tester 122 can perform the method 400. Accordingly, at block 402, the cognitive system tester 122 can collect data from personal devices 108, such as fitness gadgets and/or sleep trackers. More specifically, the cognitive system tester 122 can retrieve data from health profiles 126 of the personal devices 108. Additionally, the cognitive system tester 122 can query the listener for information related to potentially audio syndrome-inducing content for the listener. Additionally, the cognitive system tester 122 can collect specific content that is discomforting or earworm-inducing for the listener.

At block 404, the cognitive system tester 122 can generate the audio syndrome profile 124 based on the health profiles and collected information by using a trained audio syndrome predictor. The cognitive system tester 122 can be the trained audio syndrome predictor. The audio syndrome profile 124 can include specific audio content, patterns, and other parameters that describe audio content that is potentially audio syndrome-inducing for the listener.

At block 406, the audio syndrome manager 114 can reduce audio syndrome content based on the audio syndrome profile 124 by using trained syndrome response predictors. For example, the trained syndrome response predictors can include lyric analyzer-predictor 216, ad analyzer-predictor 218, and music analyzer-predictor 220.

Figure 5:
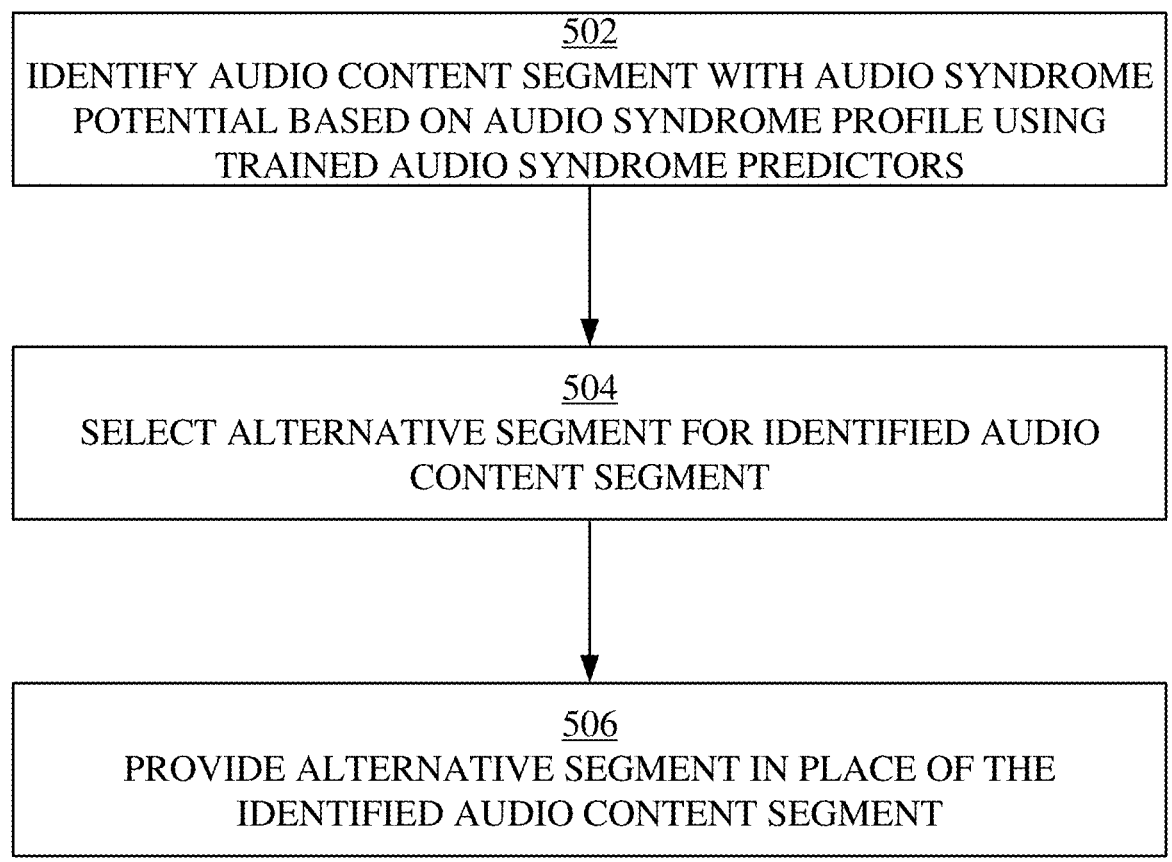
FIG. 5 is a flowchart of an example method for reducing audio syndrome content, in accordance with some embodiments of the present disclosure.

FIG. 5 is a flowchart of an example method 500 for reducing audio syndrome content, in accordance with some embodiments of the present disclosure. The audio syndrome manager 114 can perform the method 500. At block 502, the audio syndrome manager 114 can identify audio content segment with audio syndrome potential based on the audio syndrome profile 124 using trained audio syndrome predictors. As stated previously, the trained syndrome response predictors can include lyric analyzer-predictor 216, ad analyzer-predictor 218, and music analyzer-predictor 220.

At block 504, the audio syndrome manager 114 can select an alternative segment for the identified audio content segment. In some embodiments, the content mitigator 222 can select the alternative segment based on predetermined parameters specified by the listener. The alternatives can include an alternative content source, silence, sound-masked audio content, and the like.

At block 506, the audio syndrome manager 114 can provide the alternative segment in place of the identified audio content segment. For example, the content mitigator 222 can provide a specific period of silence for the mobile device 104 to play over the speaker 110 instead of the identified audio content segment.

Figure 6:
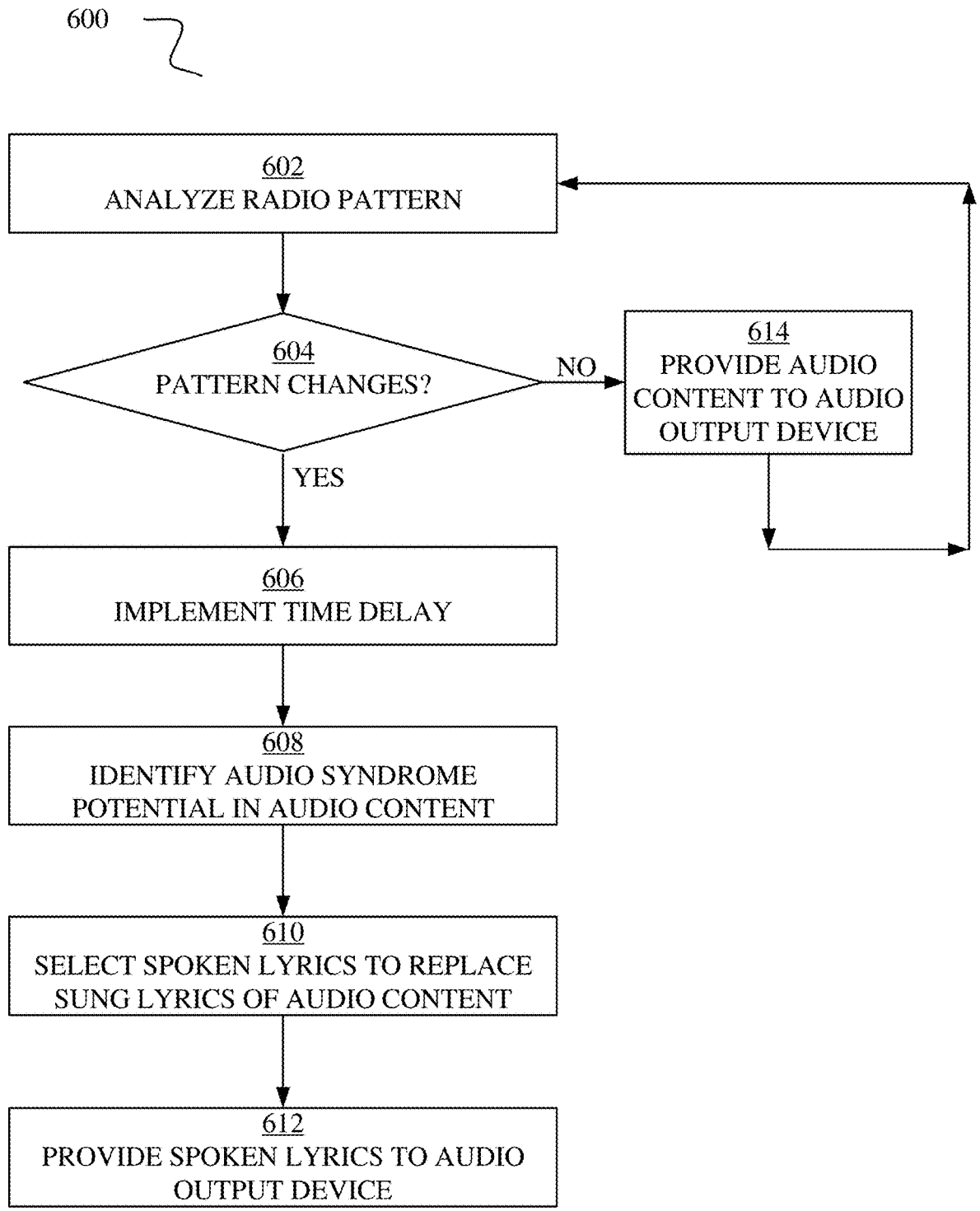
FIG. 6 is a flowchart of an example method for reducing audio syndrome content, in accordance with some embodiments of the present disclosure.

FIG. 6 is a flowchart of an example method 600 for reducing audio syndrome content, in accordance with some embodiments of the present disclosure. The audio syndrome manager 114 can perform the method 600 in accordance with some embodiments of the present disclosure. At block 602, the audio syndrome manager 114 can analyze a radio channel pattern. Analyzing the radio channel pattern can involve analyzing the pattern of sound waves produced by a radio station broadcast.

At block 604, the audio syndrome manager 114 can determine whether there is a change in the radio channel pattern. The audio syndrome manager 114 can determine whether there is a change based on a local news pattern for a specific geographic area associated with the radio station broadcast.

If a pattern is not identified (604:N), control flows to block 614, where the cognitive radio 112 can provide the audio content to an audio output device, such as the speaker 110 of the mobile device 104.

If a pattern is identified (604:Y), control flows to block 606, where the audio syndrome manager 114 can implement a time delay. Implementing a time delay can involve delaying the playing of the received signal over the speaker by a predetermined time period. The predetermined time period can be based on the computing and buffer capability of the cognitive radio 112.

At block 608, the audio syndrome manager 114 can identify audio syndrome potential in the audio content of the cognitive radio 112. The identification can be based on the audio syndrome profile 124 using trained predictors. For example, the audio syndrome manager 114 can identify a 10-second segment of sung music as having audio syndrome potential.

At block 610, the audio syndrome manager 114 can select spoken lyrics to replace the 10-second segment of sung music. Of course, other alternatives are possible. For example, the audio syndrome manager 114 can generate sound masking to attempt to cancel the audio content having audio syndrome potential.

At block 612, the audio syndrome manager 114 can provide the spoken lyrics to the audio output device. For example, the audio syndrome manager 114 can provide the spoken lyrics to the speaker 110 of the mobile device 104.

Figure 7:
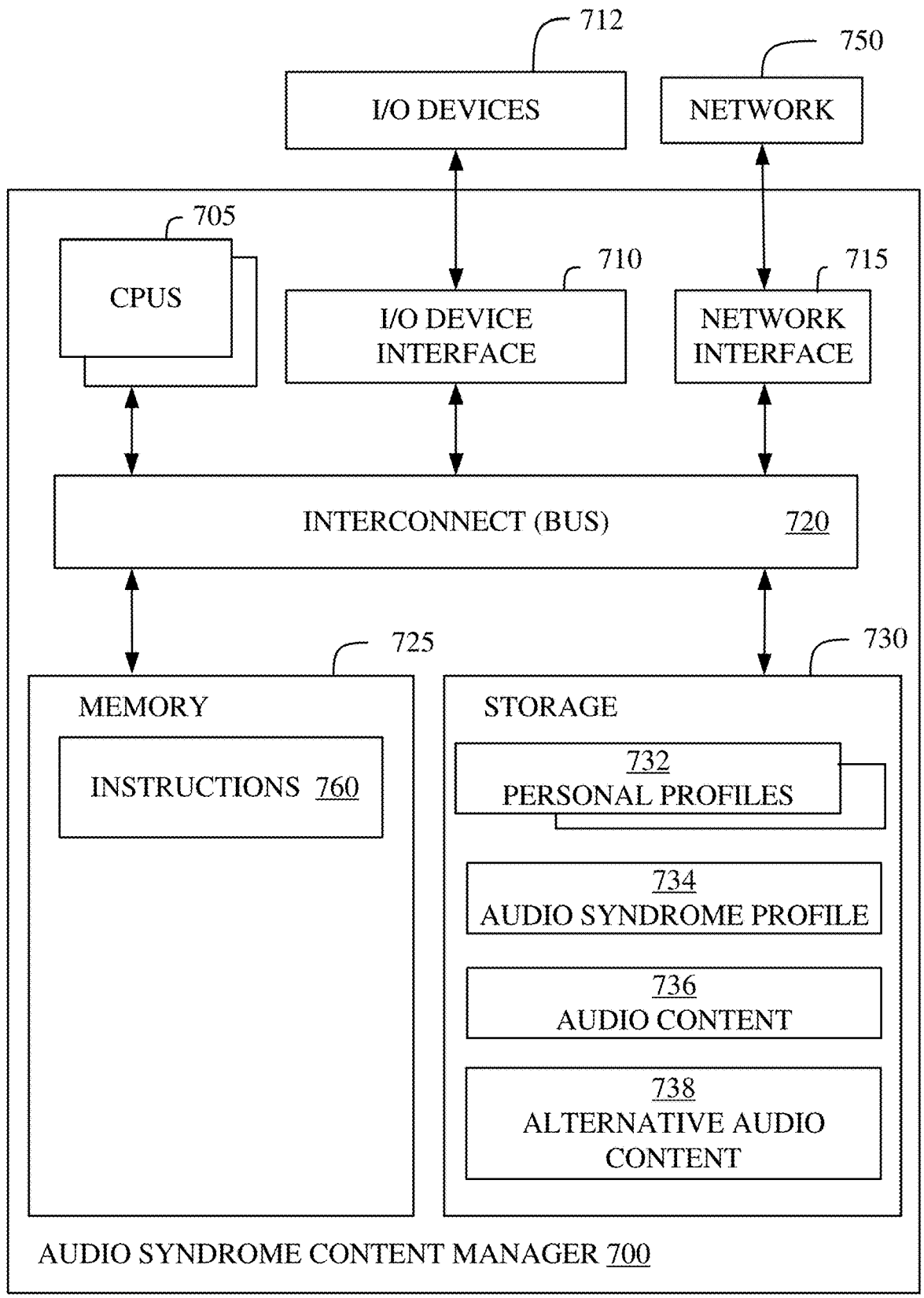
FIG. 7 is a block diagram of an example audio syndrome content manager, in accordance with some embodiments of the present disclosure.

Referring now to FIG. 7, illustrated is a block diagram of an example audio syndrome content manager 700, in accordance with some embodiments of the present disclosure. In various embodiments, the audio syndrome content manager 700 is similar to the audio syndrome manager 114 and can perform the methods described in FIGS. 4-6 and/or the functionality discussed in FIGS. 1-3. In some embodiments, the audio syndrome content manager 700 provides instructions for the aforementioned methods and/or functionalities to a client machine such that the client machine executes the method, or a portion of the method, based on the instructions provided by the audio syndrome content manager 700. In some embodiments, the audio syndrome content manager 700 comprises software executing on hardware incorporated into a plurality of devices.

The audio syndrome content manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the audio syndrome content manager 700 via the I/O device interface 710 or a network 750 via the network interface 715.

In some embodiments, the memory 725 stores instructions 760, personal profiles 732, an audio syndrome profile 734, audio content 736, and alternative radio content 738. However, in various embodiments, the instructions 760, personal profiles 732, an audio syndrome profile 734, audio content 736, and alternative radio content 738 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all, any of the methods of FIGS. 4-6 and/or any of the functionality discussed in FIGS. 1-3.

The personal profiles 732 can include health profiles, such as the health profiles 126 and app profiles 120 described with respect to FIG. 1. The audio syndrome profile 734 can be similar to the audio syndrome profiles 124 described above with respect to FIG. 1, containing data relevant to what content can be discomforting to a listener, such as, by causing earworm. The audio content 736 can include audio provided by a cognitive radio via static or dynamic content, such as static content 116 and dynamic content servers 106. Further, the audio content 736 can potentially include audio syndrome content. Accordingly, the instructions 760 can generate alternative audio content 738. The alternative radio content 738 can include syndrome-mitigated content, such as the syndrome-mitigated content 224 described with respect to FIG. 2.

In various embodiments, the I/O devices 712 include an interface capable of presenting information and receiving input. For example, I/O devices 712 can present information to a listener interacting with audio syndrome content manager 700 and receive input from the listener.

The audio syndrome content manager 700 is connected to the network 750 via the network interface 715. Network 750 can comprise a physical, wireless, cellular, or different network.

In some embodiments, the audio syndrome content manager 700 can be a multi-user mainframe computer system, a single-user system, or a server computer or similar device that has little or no direct user interface but receives requests from other computer systems (clients). Further, in some embodiments, the audio syndrome content manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary audio syndrome content manager 700. In some embodiments, however, individual components can have greater or lesser complexity than as represented in FIG. 7, components other than or in addition to those shown in FIG. 7 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
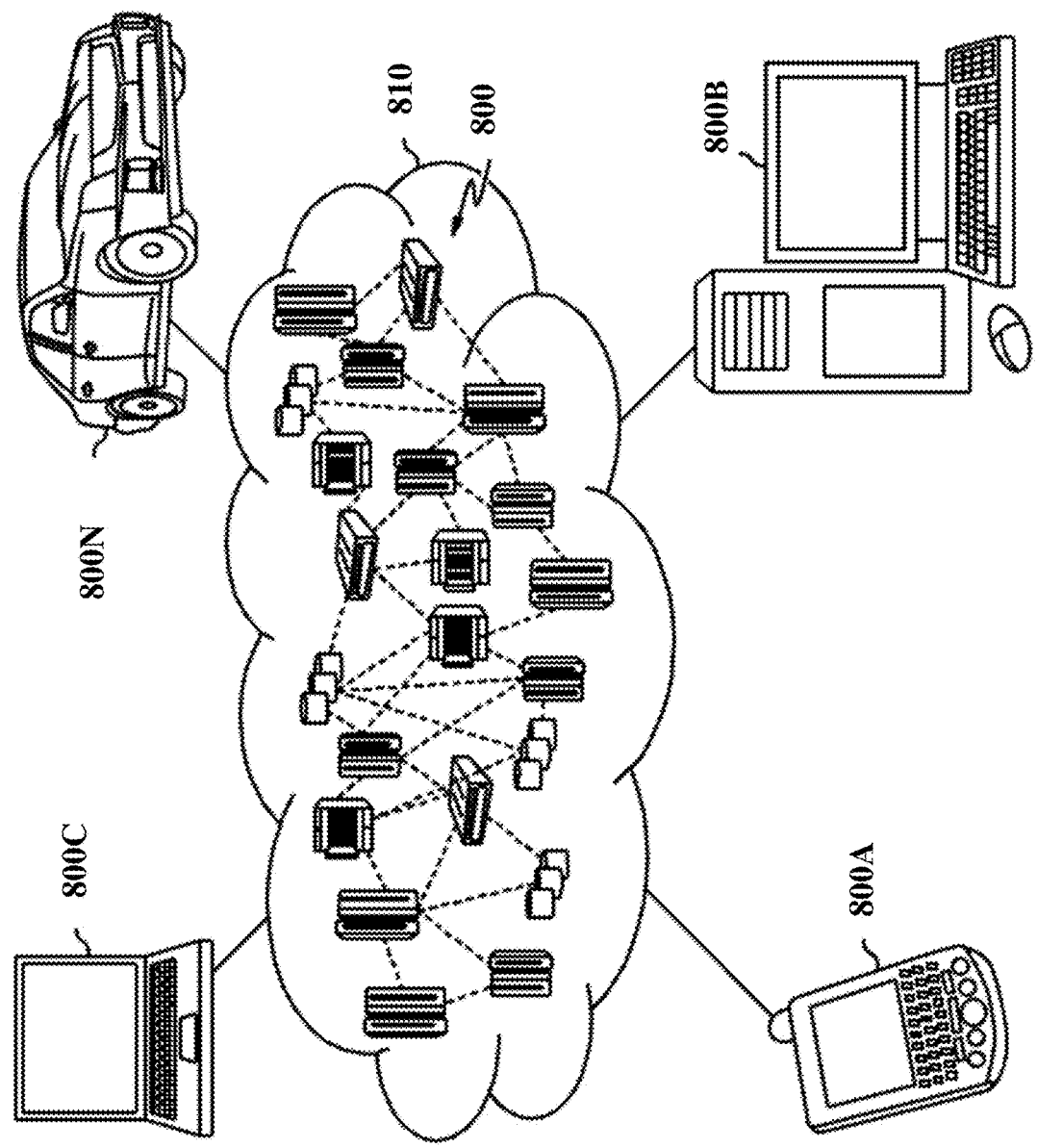
FIG. 8 depicts a cloud computing environment, according to some embodiments of the present disclosure.

Referring now to FIG. 8, which depicts a cloud computing environment 810, according to some embodiments of the present disclosure. As shown, cloud computing environment 810 includes one or more cloud computing nodes 800. The cloud computing nodes 800 can perform the methods described in FIGS. 4-6 and/or the functionality discussed in FIGS. 1-3. Additionally, cloud computing nodes 800 can communicate with local computing devices used by cloud consumers, such as, for example, personal digital assistant (PDA) or cellular telephone 800A, desktop computer 800B, laptop computer 800C, and/or automobile computer system 800N. Further, the cloud computing nodes 800 can communicate with one another. The cloud computing nodes 800 can also be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
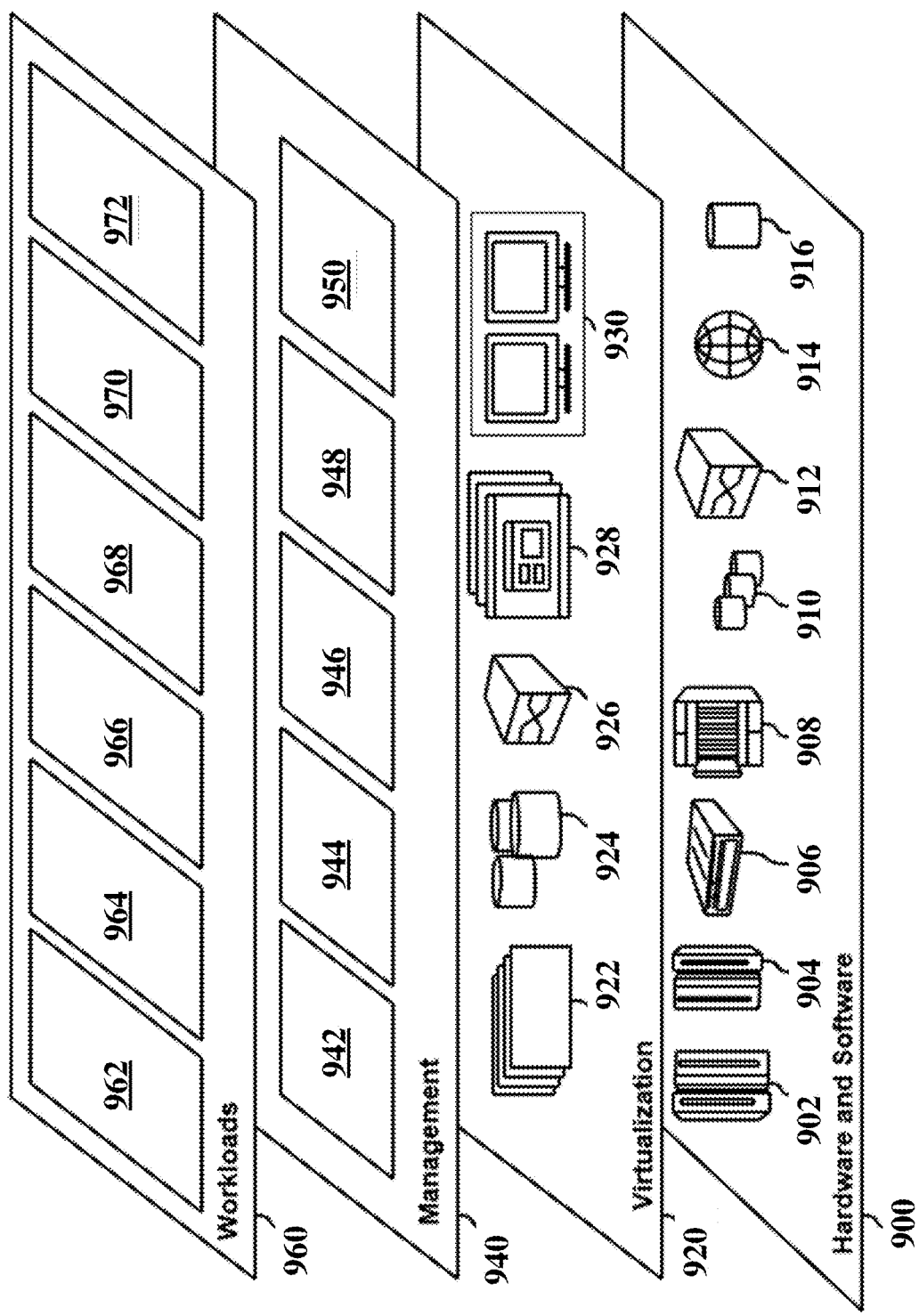
FIG. 9 depicts abstraction model layers, according to some embodiments of the present disclosure.

Referring now to FIG. 9, which depicts abstraction model layers provided by cloud computing environment 810 (FIG. 8), according to some embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service level management 948 can allocate suitable processing power and memory to process static sensor data. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and audio syndrome manager 972.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for reducing audio earworm syndrome content, comprising:
   generating a listener profile comprising data associated with content that induces an audio earworm syndrome for a listener;
   determining that current content comprises the content that induces the audio earworm syndrome for the listener based on the listener profile, using a trained audio syndrome predictor;
   in response to determining that the current content comprises the content that induces the audio earworm syndrome for the listener, generating an alternative audio content that suppresses audibility of the content that induces the audio earworm syndrome for the listener; and
   presenting the alternative audio content for the listener in place of the current content.

2. The method of claim 1, wherein the current content is received over a communication protocol selected from a group consisting of:
   a radio frequency band;
   an Institute of Electrical and Electronics Engineers (IEEE) 802.11 specification protocol frequencies;
   shortwave radio frequencies; and
   a frequency capable of wireless transmission.

3. The method of claim 2, wherein analyzing the current content is performed in real-time, and wherein the current content is delayed for a predetermined time period.

4. The method of claim 3, further comprising changing a source of the current content for a duration of the content that induces the audio earworm syndrome for the listener.

5. The method of claim 4, wherein the source of the current content comprises a channel of a wireless spectrum.

6. The method of claim 4, wherein the source of the current content comprises a frequency of a wireless spectrum.

7. The method of claim 4, wherein the source of the current content comprises a frequency band of a wireless spectrum.

8. The method of claim 4, wherein the source of the current content is changed to a recording stored on a local device.

9. The method of claim 4, further comprising audibly playing the alternative audio content for a predetermined delay.

10. The method of claim 9, further comprising buffering the current content while determining the changed source of the current content.

11. The method of claim 9, wherein the predetermined delay comprises a duration of the content that induces the audio earworm syndrome for the listener.

12. The method of claim 9, wherein the predetermined delay comprises a duration during which the content that induces the audio earworm syndrome for the listener is extracted and read back in a plain format.

13. The method of claim 9 wherein the predetermined delay is based on a buffer size of a cognitive radio receiving the current content.

14. The method of claim 1, wherein the alternative audio content comprises a sound masking of the content that is discomforting to the user.

15. A computer program product comprising program instructions stored on a computer readable storage medium, wherein the computer readable storage medium is not a transitory signal per se, the program instructions executable by a processor to cause the processor to perform a method comprising:
   generating a listener profile comprising data associated with content that induces an audio earworm syndrome for a listener;
   determining that current content comprises the content that induces the audio earworm syndrome for the listener based on the listener profile, using a trained audio syndrome predictor;
   in response to determining that the current content comprises the content that induces the audio earworm syndrome for the listener, generating an alternative audio content that suppresses audibility of the content that induces the audio earworm syndrome for the listener;
   presenting the alternative audio content for the listener in place of the current content; and
   changing a source of the current content for a duration of the content that induces the audio earworm syndrome for the listener, wherein analyzing the current content is performed in real-time, and wherein the current content is delayed for a predetermined time period.

16. The computer program product of claim 15, wherein the current content is received over a communication protocol selected from a group consisting of:
   a radio frequency band;
   an Institute of Electrical and Electronics Engineers (IEEE) 802.11 specification protocol frequencies;
   shortwave radio frequencies; and
   a frequency capable of wireless transmission.

17. The computer program product of claim 15, wherein the changed source of the current content is one of a group consisting of:
   a channel of a wireless spectrum;
   a frequency of a wireless spectrum; and
   a frequency band of a wireless spectrum.

18. The computer program product of claim 15, wherein the source of the current content is changed to a recording stored on a local device.

19. A system comprising:
   a computer processing circuit; and
   a computer-readable storage medium storing instructions, which, when executed by the computer processing circuit, are configured to cause the computer processing circuit to perform a method comprising:

generating a listener profile comprising data associated with content that induces an audio earworm syndrome for a listener;

determining that current content comprises the content that induces the audio earworm syndrome for the listener based on the listener profile, using a trained audio syndrome predictor;

in response to determining that the current content comprises the content that induces the audio earworm syndrome for the listener, generating an alternative audio content that suppresses audibility of the content that induces the audio earworm syndrome for the listener;

presenting the alternative audio content for the listener in place of the current content; and changing a source of the current content for a duration of the content that induces the audio earworm syndrome for the listener, wherein analyzing the current content is performed in real-time, and wherein the current content is delayed for a predetermined time period.

20. The system of claim 19, wherein the source of the current content is changed to a recording stored on a local device.

* * * * *